United States Patent [19]

Monden et al.

[11] Patent Number: 4,857,695

[45] Date of Patent: Aug. 15, 1989

[54] SOLDER AND SOLDERING METHOD FOR SINTERED METAL PARTS

[75] Inventors: Yukio Monden; Akira Manabe, both of Aichi, Japan

[73] Assignee: Toyota Jidosha Kabushiki Kaisha, Aichi, Japan

[21] Appl. No.: 139,633

[22] Filed: Dec. 30, 1987

[30] Foreign Application Priority Data

Jan. 26, 1987 [JP] Japan ................................. 62-15458

[51] Int. Cl.⁴ .............................................. B23K 1/00
[52] U.S. Cl. ................................ 219/85.22; 219/85.2
[58] Field of Search ........................... 219/85 H, 85 M

[56] References Cited

U.S. PATENT DOCUMENTS

| | | | |
|---|---|---|---|
| 4,444,587 | 4/1984 | Kelly | 219/85 H |
| 4,516,716 | 5/1985 | Coad | 219/85 H |
| 4,606,978 | 8/1986 | Mizuhara | 219/85 H |

FOREIGN PATENT DOCUMENTS

| | | | |
|---|---|---|---|
| 53-144852 | 12/1978 | Japan | 219/85 H |
| 271275 | 8/1970 | U.S.S.R. | 219/85 H |
| 956202 | 9/1982 | U.S.S.R. | 219/85 H |

*Primary Examiner*—Clifford C. Shaw
*Attorney, Agent, or Firm*—Oliff & Berridge

[57] ABSTRACT

Provided herein is a solder for sintered metal parts which is composed of Fe and/or Cr 5~40%, Si and/or B 1~5%, Cu 20~65%, Mn 5~30%, and Ni 20% and up, and optional flux 1~6% (by weight). The solder may lack either or both of Cu and Mn. Provided also herein is a process for soldering sintered metal parts with the solder. The solder joins parts very well with a minimum of infiltration into and corrosion to the sintered metal parts.

18 Claims, 1 Drawing Sheet

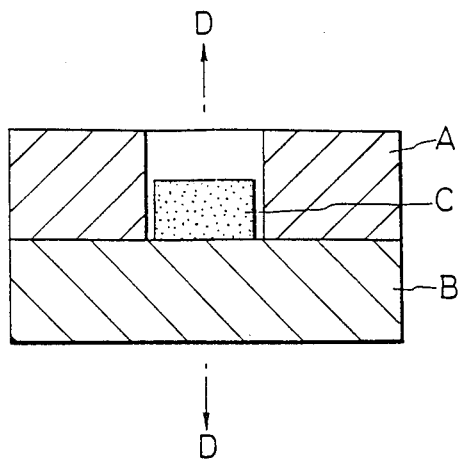

SOLDER AND SOLDERING METHOD FOR SINTERED METAL PARTS

BACKGROUND OF THE INVENTION

1. Field of the Invention

The present invention relates to a solder suitable for joining sintered metal parts, especially sintered iron parts, to each other, and also to a soldering method for said solder.

2. Description of the Prior Art

Heretofore, it has been believed to be difficult to join sintered metal parts to each other by soldering because the molten solder infiltrates into the pores of the sintered body and the solder does not stay on the joining area. Recently, however, there has been developed a new solder which permits the soldering of sintered iron parts, and it is attracting public attention. This solder is a powder of an alloy composed of Ni 40 wt%, Cu 40 wt%, and Mn 20 wt%. It is characterized by that as the molten solder infiltrates into the pores of the sintered body, it solidifies immediately upon reaction with iron in the sintered body, preventing the molten solder from infiltrating into the sintered body any more. (Refer to Zairyo Kagaku (Material Science), Vol. 21, No. 3, 162, and Kinzoku (Metals), Vol. 52, No. 1, 1982, 68.)

The above-mentioned Ni-Cu-Mn solder, however, is still subject to infiltration, although less than conventional ones, and has a disadvantage that the reaction with iron wastes the solder and causes dimensional changes. For this reason, the solder is regarded to be less economical and reliable.

SUMMARY OF THE INVENTION

According to the present invention, the solder for sintered metal parts is composed of Fe and/or Cr 5~40%, Si and/or B 1~5%, Cu 20~65%, Mn 5~30%, and Ni 20% and up (by weight). (This solder is referred to as solder 1 hereinafter.)

According to the present invention, another solder for sintered metal parts is composed of Fe and/or Cr 5~40%, Si and/or B 1~5%, Cu 20~65%, Mn 5~30%, Ni 20% and up, and flux 1~6% (by weight). (This solder is referred to as solder 2 hereinafter.)

According to the present invention, further another solder for sintered metal parts is composed of Fe and/or Cr 5~50%, Si and/or B 1~10%, and the balance of Ni (by weight). (This solder is referred to as solder 3 hereinafter.)

According to the present invention, still further another solder for sintered metal parts is composed of Fe and/or Cr 5~50%, Si and/or B 1~10%, the balance of Ni, and flux 1~6% (by weight). (This solder is referred to as solder 4 hereinafter.)

According to the present invention, still further another solder for sintered metal parts is composed of Fe and/or Cr 5~50%, Si and/or B 1~10%, Mn 5~30%, and the balance of Ni (by weight). (This solder is referred to as solder 5 hereinafter.)

According to the present invention, still further another solder for sintered metal parts is composed of Fe and/or Cr 5~50%, Si and/or B 1~10%, and the balance of Ni (by weight). (This solder is referred to as solder 6 hereinafter.)

According to the present invention, still further another solder for sintered metal parts is composed of Fe and/or Cr 5~50%, Si and/or B 1~10%, Cu 10~50%, and the balance of Ni (by weight). (This solder is referred to as solder 7 hereinafter.)

According to the present invention, still further another solder for sintered metal parts is composed of Fe and/or Cr 5~50%, Si and/or B 1~10%, Cu 10~50%, the balance of Ni, and flux 1~6% (by weight). (This solder is referred to as solder 8 hereinafter.)

Fe and/or Cr forms crystals upon reaction with B and/or Si, preventing the solder from infiltrating into and corroding the sintered iron alloy. With a total content less than 5%, they do not fully produce their effect; and with a content in excess of 50%, they raise the melting point of the solder, creating a situation in which the solder tends to remain partly unmelted. Thus their content should preferably be 5~50%.

Si and/or B forms crystals upon reaction with Fe and/or Cr, preventing the solder from infiltrating into the sintered products and also lowering the melting point to increase the flowability. With a total content less than 1%, they do not fully produce their effect; and with a content in excess of 10%, the solder is corrosive to sintered products. Thus their content should preferably be 1~10%.

Cu adds to the soldering strength. In the case of a solder containing Fe and/or Cr 5-40%, Si and/or B 1-5%, Mn 5-30%, and Ni 20% and up by weight, with a content less than 20%, Cu does not fully produce its effect; with a content in excess of 65%, the solder is more liable to infiltrate into the sintered products. The preferred content of Cu should be 20 to 65%, if it is added.

In the case of a solder containing, by weight, Fe and Cr 5-50%, Si and/or B 1-10% and the balance Ni, with a content of 10% or less, Cu does not fully produce its effect; with a content in excess of 50%, the solder is more liable to infiltrate into the sintered product. Therefore, in such a composition, the preferred content of Cu should be in the range of 10-50%, if it is added.

Mn lowers the melting point and hence increases the flowability. With a content less than 5%, it does not fully produce its effect; and with a content in excess of 30%, the solder is corrosive to the sintered products. The preferred content of Mn should be 5 to 30%, if it is added.

The flux is a boron compound. It improves the flowability of the solder. With a content less than 1%, it does not fully product its effect; and with a content in excess of 6%, it does not produce any additional effect but increases the cost of the solder. The preferred content of the flux should be 1 to 6%, if it is added.

Ni prevents the solder from infiltrating into the sintered body. With a content less than 20%, it does not fully product its effect. The content of Ni should preferably be 20% and up.

The solder of the present invention may be in the form of powder of alloy alone or in the form of alloy powder containing a simple metal powder.

The total weight of the solder and flux on the joining area should be in the range from 0.1 to 0.6 g/cm$^2$. If it is less than 0.1 g/cm$^2$ the solder does not completely cover the joining area but leaves some parts unjoined; and if it is more than 0.6 g/cm$^2$ the solder oozes out of the joining area and remains more in the pores in the sintered product.

According to the present invention, soldering is accomplished in the following manner.

In the case of solder 1, dewaxing is carried out at 650°~750° C. for 20~40 minutes and subsequently soldering is carried out at 1100°~1150° C. for 20~40 minutes in AX gas.

In the case of solder 2, dewaxing is carried out at 650°~750° C. for 20~40 minutes and subsequently soldering is carried out at 1100°~1150° C. for 20~40 minutes in AX gas (a tradename for dissociated ammonia gas,, which is a reducing gas obtained by dissolution of $NH_3$, consisting of 75 vol. % $H_2$ and 25 vol. % $N_2$) or butane-modified gas (an endothermic gas mixture of CO, $H_2$ and $N_2$ which is a heat-absorptive gas).

In the case of solder 3, 4, 5, 6, 7, or 8, dewaxing is carried out at 650°~750° C. for 20~40 minutes and subsequently soldering is carried out at 1100°~1150° C. for 50~70 minutes in nitrogen gas.

According to the present invention, the solder for sintered metal parts is composed of the Ni-Cu-Mn base and proper amounts of Fe, Cr, and Si or B, as mentioned above, and it has an extremely low degree of infiltration and corrosion. It is improved in flowability if it is incorporated with a flux according to need. Thus the solder of the present invention permits the satisfactory soldering of sintered metal parts.

Examples 1, 3, 6, 10, and 12, the alloy powder was incorporated with a flux.

On the other hand, an annular molded piece A and a discoid molded piece B (as shown in the FIGURE) were produced by compression molding under a pressure of 6 ton/cm² from a powder mixture composed of 0.8 wt% of carbon powder (finer than 350 mesh), 2 wt% of electrolytic copper powder (finer than 250 mesh), 0.8 wt% of zinc stearate, and the balance of atomized iron powder.

The annular molded piece A was placed on the discoid molded piece B as shown in the FIGURE. The discoid molded piece C was inserted into the hole of the molded piece A. The assembly was heated at 700° C. for 30 minutes for dewaxing and then at 1120° C. for 30 minutes for soldering in AX gas. The soldered assembly was vertically cut into two parts along the line D—D. After polishing, the section was microscopically examined to see if the molded piece C infiltrated into and corroded the molded piece B. Neither infiltration nor corrosion were noticed in Examples 1 to 12.

TABLE 1

| Example | Composition (wt. %) | | | | | | | Solder (%)[1] | Flux (%)[2] | Solder + flux[3] | Dewaxing | Soldering |
|---|---|---|---|---|---|---|---|---|---|---|---|---|
| | Ni | Cu | Mn | Fe | Cr | Si | B | | | | | |
| 1 | 32 | 35 | 25 | 8 | — | — | — | 98 | 2 | 0.2 | A | A |
| 2 | 36 | 27 | 27 | 10 | — | — | — | 100 | — | 0.4 | A | A |
| 3 | 35 | 30 | 26 | 7 | — | 1 | 1 | 97 | 3 | 0.3 | A | A |
| 4 | 30 | 40 | 12 | 15 | — | 1 | 2 | 100 | — | 0.2 | A | A |
| 5 | 30 | 25 | 19 | 22 | — | 2 | 2 | 100 | — | 0.5 | A | A |
| 6 | 31.5 | 24 | 10 | 30 | — | 2 | 2.5 | 96 | 4 | 0.4 | A | A |
| 7 | 32 | 35 | 25 | — | 8 | — | — | 100 | — | 0.6 | A | A |
| 8 | 36 | 27 | 27 | — | 10 | — | — | 100 | — | 0.2 | A | A |
| 9 | 35 | 30 | 24 | — | 8 | 2 | 1 | 100 | — | 0.3 | A | A |
| 10 | 30 | 40 | 12 | — | 15 | 1 | 2 | 95 | 5 | 0.5 | A | A |
| 11 | 30 | 25 | 19 | — | 22 | 2 | 2 | 100 | — | 0.2 | A | A |
| 12 | 31.5 | 24 | 10 | — | 30 | 2 | 2.5 | 97 | 3 | 0.3 | A | A |

[1] The ratio (wt. %) the solder component accounts for in the total amount of the solder material.
[2] The ratio (wt. %) the flux accounts for in the total amount of the solder material.
[3] The total amount (g/cm²) of the solder and flux on the joining area.

BRIEF DESCRIPTION OF THE DRAWING

The single drawing is a sectional view showing the molded pieces used for the soldering test and the setting state of the solder.

DETAILED DESCRIPTION OF THE INVENTION

The invention will be described in more detail with reference to the following examples.

EXAMPLES 1 to 12

An alloy having the composition as shown in Table 1 was made into powder finer than 60 mesh by atomizing. The resulting alloy powder was formed into a discoid molded piece C (as shown in the FIGURE) by compression molding under a pressure of 5 ton/cm². In

EXAMPLES 13 TO 33

The same procedure as in Examples 1 to 12 was repeated for the preparation of molded pieces A, B, and C and the dewaxing and soldering, except that the composition for the molded piece C and the dewaxing and soldering conditions were changed as shown in Table 2. After soldering, the samples were examined for infiltration and corrosion.

In Table 2, the dewaxing conditions are indicated by "A" (at 700° C. for 30 minutes in AX gas), "B" (at 700° C. for 30 minutes in nitrogen gas), and "C" (at 700° C. for 30 minutes in butane-modified gas). Also, the soldering conditions are indicated by "A" (at 1120° C. for 30 minutes) and "B" (at 1130° C. for 60 minutes).

In Examples 13 to 16 and 22 to 33, the molded piece C was produced from an alloy powder finer than 42 mesh, and in Examples 17 to 21, the molded piece C was produced from an alloy powder finer than 60 mesh.

TABLE 2

| Example | Composition (wt. %) | | | | | | | Solder (%)[1] | Flux (%)[2] | Solder + flux[3] | Dewaxing | Soldering |
|---|---|---|---|---|---|---|---|---|---|---|---|---|
| | Ni | Cu | Mn | Fe | Cr | Si | B | | | | | |
| 13 | 87 | — | — | — | 10 | 2 | 1 | 100 | — | 0.3 | B | B |
| 14 | 77 | — | — | — | 20 | 3 | — | 100 | — | 0.2 | B | B |
| 15 | 64.5 | — | — | — | 30 | 3 | 2.5 | 98 | 2 | 0.4 | B | B |
| 16 | 52 | — | — | — | 40 | 6 | 2 | 100 | — | 0.3 | B | B |
| 17 | 34 | 31 | 25 | 8 | — | 1 | 1 | 97 | 3 | 0.2 | C | A |
| 18 | 31 | 40 | 11 | 15 | — | 1 | 2 | 96 | 4 | 0.3 | C | A |
| 19 | 32 | 23 | 19 | 8 | 14 | 2.5 | 1.5 | 98 | 2 | 0.2 | C | A |
| 20 | 31.5 | 25 | 9 | 15 | 15 | 2.5 | 2 | 97 | 3 | 0.4 | C | A |

TABLE 2-continued

| Example | Composition (wt. %) | | | | | | | Solder (%)[1] | Flux (%)[2] | Solder + flux[3] | Dewaxing | Soldering |
|---|---|---|---|---|---|---|---|---|---|---|---|---|
| | Ni | Cu | Mn | Fe | Cr | Si | B | | | | | |
| 21 | 33 | 34 | 22 | 9 | — | 1 | 1 | 96 | 4 | 0.3 | C | A |
| 22 | 23 | 59 | 8 | 6 | 1 | 2 | 1 | 100 | — | 0.5 | A | A |
| 23 | 30 | 41 | 10 | 10 | 5 | 2.5 | 1.5 | 100 | — | 0.3 | A | A |
| 24 | 25 | 25 | 15.5 | 20 | 10 | 2 | 2.5 | 97 | 3 | 0.2 | A | A |
| 25 | 27 | 33 | 15 | 15 | 5 | 3.5 | 1.5 | 100 | — | 0.4 | A | A |
| 26 | 52 | — | 10 | 30 | — | 6 | 2 | 97 | 3 | 0.3 | B | B |
| 27 | 72 | — | 15 | — | 10 | 2 | 1 | 100 | — | 0.2 | B | B |
| 28 | 49 | — | 20 | 15 | 10 | 4 | 2 | 96 | 4 | 0.5 | B | B |
| 29 | 30 | — | 25 | 20 | 20 | 4 | 1 | 100 | — | 0.3 | B | B |
| 30 | 50 | 15 | — | 30 | — | 3 | 2 | 100 | — | 0.3 | B | B |
| 31 | 44 | 20 | — | — | 30 | 4 | 2 | 96 | 4 | 0.4 | B | B |
| 32 | 54 | 30 | — | 5 | 5 | 5 | 1 | 100 | — | 0.2 | B | B |
| 33 | 22 | 30 | 0 | 40 | — | 7 | 1 | 98 | 2 | 0.4 | B | B |

[1], [2], and [3] are the same as in Table 1.

Examples 1 to 12 and 17 to 25 deal with solders 1 and 2, Examples 13 to 16 deal with solders 3 and 4, Examples 26 to 29 deal with solders 5 and 6, and Examples 30 to 33 deal with solders 7 and 8. In all the examples, there were no instances where the molded piece C infiltrated into and corroded the molded piece B and the molded piece C remained partly unmelted. Good joining was obtained in all the examples.

By contrast, unsatisfactory results were produced in Comparative Examples. In Comparative Examples 1 and 4, in which the content of Fe or Cr is as low as 3.5%, and in Comparative Examples 3 and 6, in which the content of Ni is as low as 9%, infiltration and corrosion were noticed. In Comparative Examples 2 and 5, in which the content of Mn is low and the content of Fe or Cr is high, the solder remained partly unmelted. In Comparative Example 7, in which the content of Cr is low and the content of Si or B is excessively high, infiltration and corrosion were noticed. In Comparative Examples 8, in which the content of Cr is excessively high, the solder remained partly unmelted. In Comparative Example 9, in which the content of Mn is excessively high, the content of copper is low, and the amount of solder and flux on the joining area is small, infiltration and corrosion were noticed and joining was poor. In Comparative Example 10, in which the content of Mn, Si, or B is excessively low, the solder remained partly unmelted. In Comparative Example 11, in which the content of B and Si is excessively high and the content of Ni is low, infiltration and corrosion occurred and joining was poor. In Comparative Example 12, in which the amount of solder and flux on the joining area is excessively high, the solder oozed out of the edge. In Comparative Example 13, in which the content of Mn and Fe is low and the content of B and Si is excessively high, infiltration and corrosion occurred. In Comparative Examples 14, in which the content of Fe and Cr is excessively high, the solder remained partly unmelted. In Comparative Example 15, in which the content of Cu, Fe, and Cr is low and the content of B and Si is excessively high, infiltration and corrosion occurred. In Comparative Example 16, in which the content of Fe and Cr is excessively high, the solder remained partly unmelted.

TABLE 3

| Comp. Exam. | Composition (wt. %) | | | | | | | Solder (%)[1] | Flux (%)[2] | Solder + flux[3] | Dewaxing | Soldering |
|---|---|---|---|---|---|---|---|---|---|---|---|---|
| | Ni | Cu | Mn | Fe | Cr | Si | B | | | | | |
| 1 | 43 | 17 | 33 | 3.5 | — | 2 | 1.5 | 100 | — | 0.2 | A | A |
| 2 | 30.7 | 25 | 2 | 42 | — | 0.2 | 0.1 | 100 | — | 0.4 | A | A |
| 3 | 9.5 | 53 | 20 | 10 | — | 5 | 2.5 | 97 | 3 | 0.3 | A | A |
| 4 | 41 | 19 | 33 | — | 3.5 | 2.5 | 1 | 100 | — | 0.4 | A | A |
| 5 | 29.6 | 26 | 3 | — | 41 | 0.2 | 0.2 | 98 | 2 | 0.5 | A | A |
| 6 | 9 | 54 | 20 | — | 10 | 5 | 2 | 100 | — | 0.2 | A | A |
| 7 | 85 | — | — | — | 2 | 8 | 5 | 96 | 4 | 0.3 | B | B |
| 8 | 39.5 | — | — | — | 60 | 0.5 | — | 100 | — | 0.4 | B | B |
| 9 | 42 | 18 | 32 | 4.5 | — | 2 | 1.5 | 96 | 4 | 0.05 | C | A |
| 10 | 31.7 | 24 | 3 | 20 | 21 | 0.1 | 0.2 | 98.8 | 1.2 | 0.5 | C | A |
| 11 | 10 | 52.5 | 16 | 11 | — | 7 | 3.5 | 99.3 | 0.7 | 0.3 | C | A |
| 12 | 30 | 35 | 15 | 10 | 7 | 2 | 1 | 98 | 2 | 0.9 | C | A |
| 13 | 83 | — | 3 | 3 | — | 7 | 4 | 100 | — | 0.3 | B | B |
| 14 | 24.5 | — | 15 | 30 | 30 | 0.5 | — | 97 | 3 | 0.2 | B | B |
| 15 | 80 | 6 | — | 3 | — | 8 | 3 | 100 | — | 0.4 | B | B |
| 16 | 19.5 | 20 | — | 30 | 30 | 0.5 | — | 97 | 3 | 0.5 | B | B |

[1], [2], and [3] are the same as in Table 1.

What is claimed is:

1. A solder for sintered metal parts which comprises, by weight, 5-40% of at least one of Fe and Cr, 1-5% of at least one of Si and B, 20-65% Cu, 5-30% Mn, and 20% and up Ni.

2. A solder for sintered metal parts which comprises, by weight, 5-40% by weight of at least one of Fe and Cr, 1-5% of at least one of Si and B, 20-65% Cu, 5-30% Mn, 20% and up Ni, and 1-6% flux.

3. A solder for sintered metal parts consisting essentially of, by weight, 5-50% of at least one of Fe and Cr, 1-10% of at least one of Si and B, and the balance Ni.

4. A solder for sintered metal parts consisting essentially of, by weight, 5-50% of at least one of Fe and Cr, 1-10% of at least one of Si and B, 1-6% flux, and the balance Ni.

5. A solder for sintered metal parts which comprises, by weight, 5-50% of at least one of Fe and Cr, 1-10% of at least one of Si and B, 5-30% Mn, and 20% and up Ni.

6. A solder for sintered metal parts which comprises, by weight, 5–50% of at least one of Fe and Cr, 1–10% of at least one of Si and B, 5–30% of Mn, 1–6% flux, and 20% and up Ni.

7. A solder for sintered metal parts consisting essentially of, by weight, 5–50% of at least one of Fe and Cr, 1–10% of at least one of Si and B, 10–50% of Cu, and the balance Ni.

8. A solder for sintered metal parts consisting essentially of, by weight, 5–50% of at least one of Fe and Cr, 1–10% of at least one of Si and B, 10–50% Cu, 1–6% flux, and the balance Ni.

9. A process for soldering sintered metal parts which comprises performing dewaxing at 650°–750° C. for 20–40 minutes and subsequently performing soldering at 1100°–1150° C. for 20–40 minutes with a solder for sintered metal parts which comprises by weight, 5–40% of at least one of Fe and Cr, 1–5% of at least one of Si and B, 20–65% Cu, 5–30% Mn, and 20% and up Ni.

10. The process according to claim 9, wherein the soldering is performed in dissociated ammonia gas.

11. The process according to claim 12, wherein the soldering is performed in dissociated ammonia gas or a gas mixture of CO, $H_2$ and $N_2$.

12. A process for soldering sintered metal parts which comprises performing dewaxing at 650°–750° C. for 20–40 minutes and subsequently performing soldering at 1100°–1150° C. for 20–40 minutes with a solder for sintered metal parts which comprises, by weight, 5–40% of at least one of Fe and Cr, 1–5% of at least one of Si and B, 20–65% Cu, 5–30% Mn, 1–6% flux, and 20% and up Ni.

13. A process for soldering sintered metal parts which comprises performing dewaxing at 650°–750° C. for 20–40 minutes and subsequently performing soldering at 1100°–1150° C. for 50–70 minutes in nitrogen gas with a solder for sintered metal parts which comprises, by weight, 5–50% of at least one of Fe and Cr, 1–10% of at least one of Si and B, and the balance Ni.

14. A process for soldering sintered metal parts which comprises performing dewaxing at 650°–750° C. for 20–40 minutes and subsequently performing soldering at 1100°–1150° C. for 50–70 minutes in nitrogen gas with a solder for sintered metal parts which comprises, by weight, 5–50% of at least one of Fe and Cr, 1–10% of at least one of Si and B, 1–6% flux, and the balance Ni.

15. A process for soldering sintered metal parts which comprises performing dewaxing at 650°–750° C. for 20–40 minutes and subsequently performing soldering at 1100°–1150° C. for 50–70 minutes in nitrogen gas with a solder for sintered metal parts which comprises, by weight, 5–50% of at least one of Fe and Cr, 1–10% of at least one of Si and B, 5–30% Mn, and the balance Ni.

16. A process for soldering sintered metal parts which comprises performing dewaxing at 650°–750° C. for 20–40 minutes and subsequently performing soldering at 1100°–1150° C. for 50–70 minutes in nitrogen gas with a solder for sintered metal parts which comprises, by weight, 5–50% of at least one of Fe and Cr, 1–10% of at least one of Si and B, 5–30% Mn, 1–6% flux, and the balance Ni.

17. A process for soldering sintered metal parts which comprises performing dewaxing at 650°–750° C. for 20–40 minutes and subsequently performing soldering at 1100°–1150° C. for 50–70 minutes in nitrogen gas with a solder for sintered metal parts which comprises, by weight, 5–50% of at least one of Fe and Cr, 1–10% of at least one of Si and B, 10–50% Cu, and the balance Ni.

18. A process for soldering sintered metal parts which comprises performing dewaxing at 650°–750° C. for 20–40 minutes and subsequently performing soldering at 1100°–1150° C. for 50–70 minutes in nitrogen gas with a solder for sintered metal parts which comprises, by weight, 5–50% of at least one of Fe and Cr, 1–10% of at least one of Si and B, 10–50% Cu, 1–6% flux, and the balance Ni.

* * * * *